Sept. 2, 1969　　　　R. W. DAVIDSON　　　　3,464,713
LOW PROFILE DOLLY

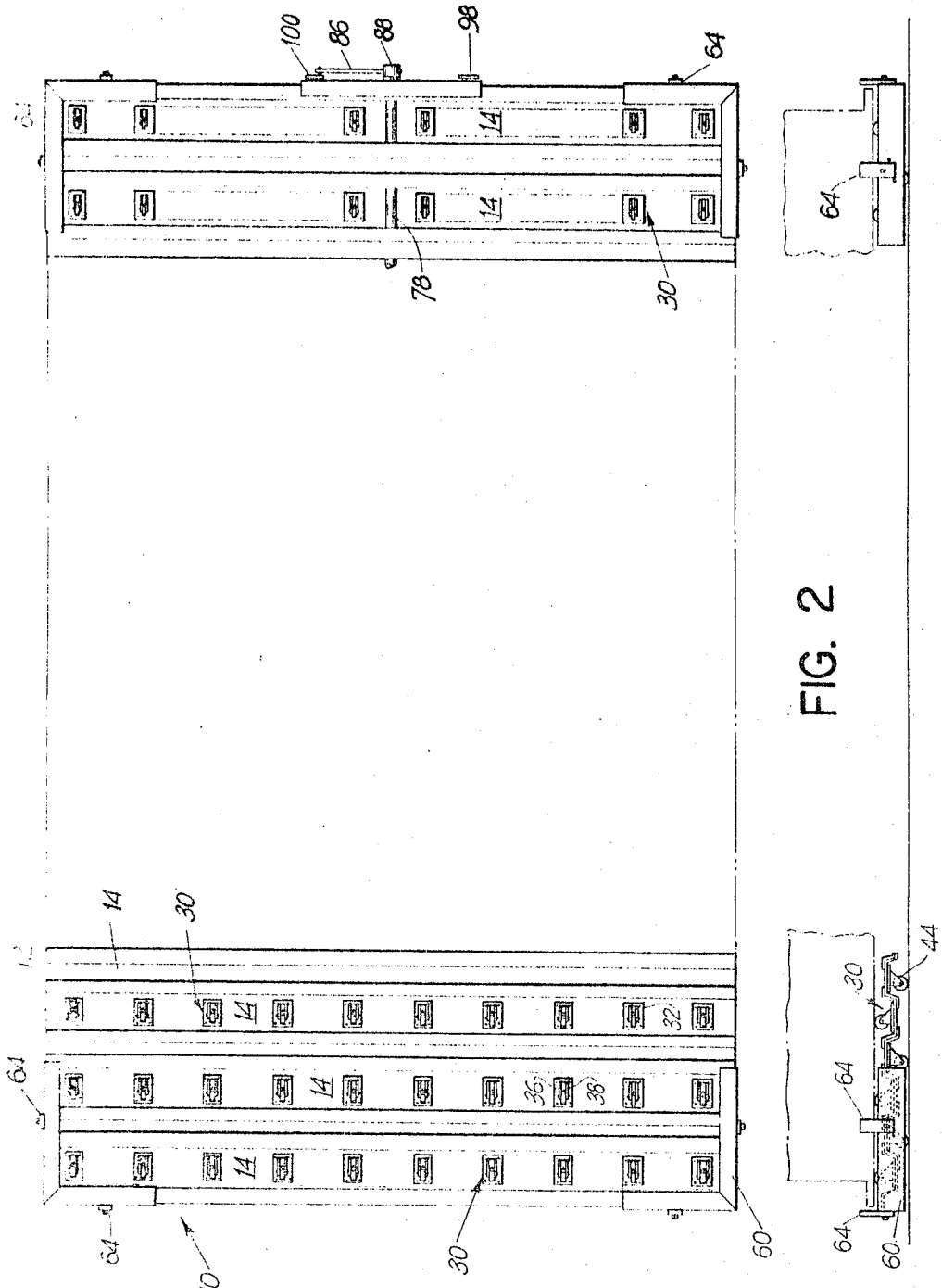

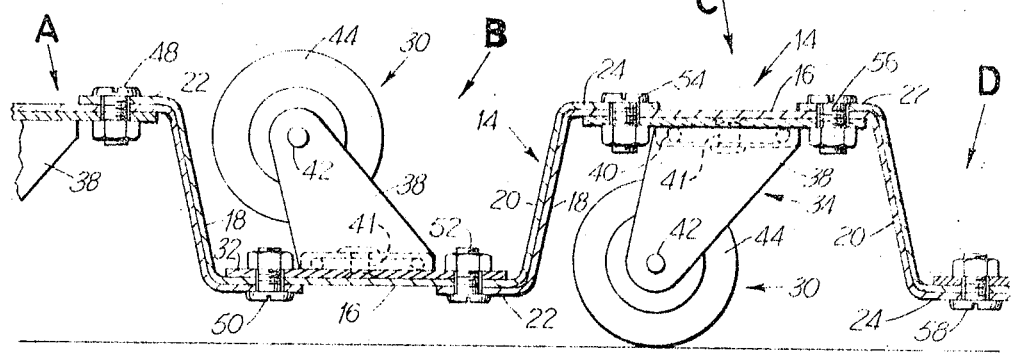
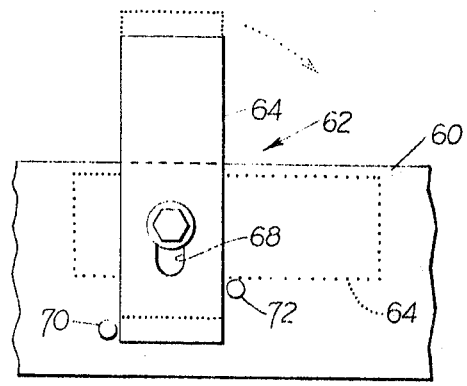
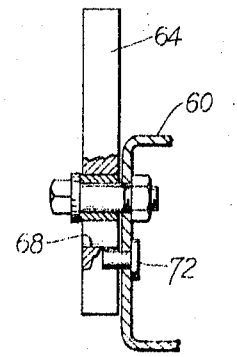
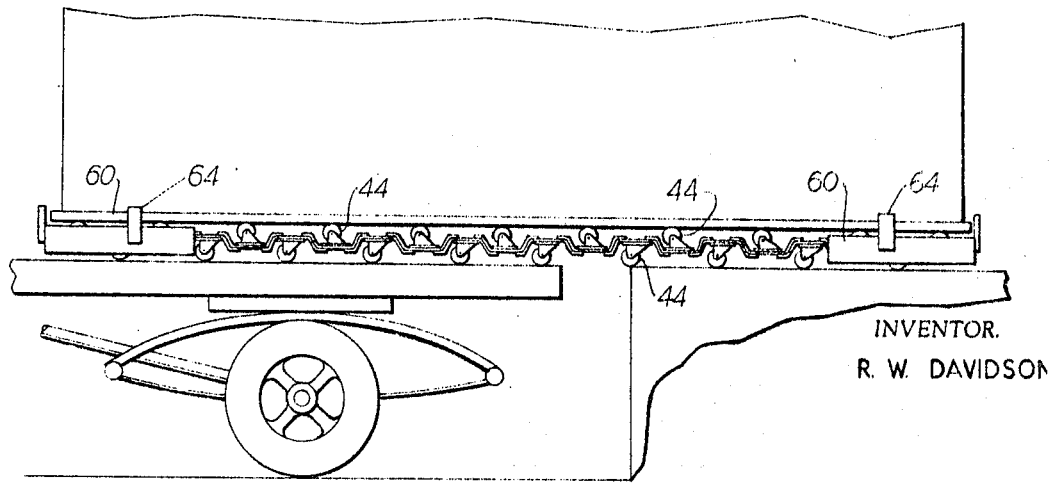

Filed Aug. 26, 1968　　　　　　　　　　　3 Sheets-Sheet 3

INVENTOR.
R. W. DAVIDSON

United States Patent Office 3,464,713
Patented Sept. 2, 1969

3,464,713
LOW PROFILE DOLLY
Robert W. Davidson, York, Pa., assignor to American Machine & Foundry Company, a corporation of New Jersey
Filed Aug. 26, 1968, Ser. No. 755,249
Int. Cl. B60b 33/00; B62b 11/00
U.S. Cl. 280—79.1       7 Claims

ABSTRACT OF THE DISCLOSURE

A dolly comprising a corrugated platform, a row of casters mounted to each of the high portions of the under surface of the platform for engaging the ground and a row of casters mounted to each of the low portions of the upper surface of the platform for engaging a load. Restraint means for the load are mounted adjacent the corners of the platform.

BACKGROUND

This invention relates to dollies for transporting articles an dmore specifically to a conveyorized dolly having a low profile for readily receiving, transporting and discharging loads.

In cargo operations, a large portion of the total traffic is transported at one time during its travel in bulk groups on a pallet. This is particularly true in the air cargo industry where air cargo is placed in aircraft in unitized loads that usually weigh several thousands of pounds. These unitized loads usually comprise tens or hundreds of smaller packages that are built up into the unitized load, which frequently reach several feet in height.

Due to the size and weight of these unitized loads, their handling in all phases is difficult—the building up thereof, the breakdown thereof and the movement thereon in and between ground facilities prior to or after air transport. One reason for the difficulty in handling these unitized loads is the vertical height to which they are commonly built up. Another difficulty arises out of the need for manual movement of these heavy unitized loads about terminals where congestion does not permit vehicular assistance. A further difficulty stems from the need for transporting these unitized loads between consolidating stations and airline freight terminals via commercial type trucks and vans.

A current method of transporting these loads about ground facilities is the conventional pallet trailer, which comprises a load conveying surface mounted upon a heavy rigid structure mounted over corner mounted ground engaging wheels or casters of sufficient size and strength to accept the high weights involved. The height of the conveying surface elements combined with the heavy structural members and the large ground engaging wheels involved in these prior art dollies results in a load carrying platform which is nineteen to twenty-four inches above the ground.

This creates a problem in that the upper portions of standard size load units cannot be reached by personnel standing on the ground and therefore difficulty exists in placing articles in and removing them from the upper portions of the load unit. The extreme height further limits transportation of these loaded dollies to open flat bed trucks where they are not restricted by overhead. Under these conditions the loads are undesirably exposed to weather.

Another problem commonly encountered in prior art dollies is the difficulty in maneuvering them about ground facilities. This is due to the high loads which must be supported by the limited number of ground engaging wheels, resulting in high wheel bearing pressures and large tire footprints. Both of these factors introduce rolling resistances which are out of proportion to the loads placed thereon. Still another problem exists with prior art dollies as a result of their inability to traverse gaps such as those existing between a truck and a warehouse dock, thus requiring the assistance of costly overhead cranes or similar devices when the frequent transfers of this type are made. This inability derives from the existance of long unsupported spans between the ground engaging wheels which permits them to individually drop into gaps and there be held in arrestment by the high unit loads which they are obliged to support.

Summary

It is, therefore, an object of this invention to provide a dolly having a low platform for readily receiving and discharging articles.

It is a further object of this invention to provide a dolly having inherently low rolling resistance and hence a high degree of maneuverability.

It is yet another object of this invention to provide a dolly having the capability of traversing faults and gaps in the ground over which it travels.

It is a still further object of this invention to provide a dolly having high structural integrity combined with light weight.

In accordance with these and other objects, the invention comprises a platform having a plurality of members mounted to the underside thereof for engaging the ground for movement of the platform therealong and a plurality of members mounted to the upper surface thereof for supporting loads for movement thereon.

Description of the drawings

FIG. 1 is a partial plan view of a dolly according to the invention.

FIG. 2 is a partial side view of the dolly of FIG. 1.

FIG. 3 is a sectional view of a portion of the dolly, taken along line 3—3 of FIG. 1.

FIG. 4 is an enlarged front elevation view of a restraint means for the subject invention.

FIG. 5 is a side view of the restraint means shown in FIG. 4.

FIG. 6 is a side view of the subject invention, illustrating its capability for traversing irregular ground, in this case a gap between a truck bed and a loading dock.

Description of the preferred embodiment

Figure 7:
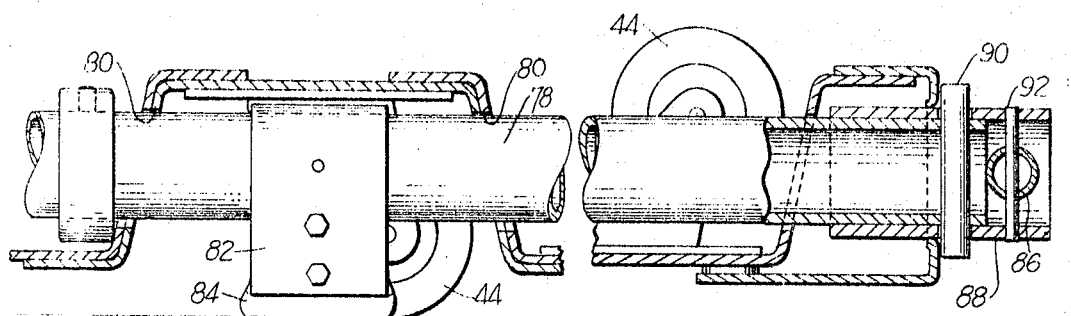
FIG. 7 is a partial sectional view of the subject invention showing portions of a brake unit for the dolly.
Figure 8:
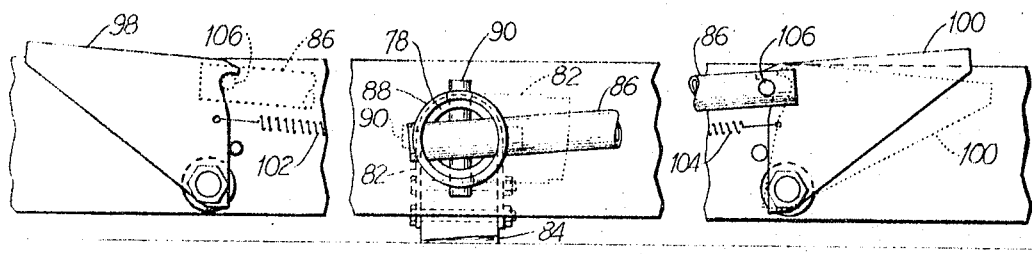
FIG. 8 is a partial side view of the dolly showing an actuating mechanism for the brake unit.

With reference to the drawings, apparatus according to the invention may comprise a dolly 10 comprising a corrugated platform 12. Referring in particular to FIGS. 1–3, platform 12 comprises a plurality of diverging, flanged channels 14 mounted together such that the open end of adjacent channels face in opposite directions, as seen in FIG. 3. Each channel includes a base 16, side portions 18 and 20 diverging away from the base 16 and flanges 22 and 24 at the end of the side portions.

A plurality of caster units 30 are bolted in rows to the upper surface of the bases of upwardly facing channels and to the lower surface of the bases of downwardly facing channels.

Caster units 30 comprise a base plate 32 having four apertures at the corners thereof to receive bolts for attaching the base plate to the platform 12. A roller support 34, including two vertically extending members 36, 38 and a ball bearing retaining member 40 therebetween, is connected to base plate 30 by a pivotal member 42. A roller 44 is rotatably mounted on a shaft 46 which is rigidly mounted between vertically extending members 36 and 38. With this arrangement, the caster units can swivel 360 degrees around pivotal member 42 to face in any direction and roll in that direction.

Since platform 12 includes a large number of both upwardly facing channels and downwardly facing channels, there are a large number of casters arranged on the bottom surface of the platform facing downwardly for engaging the ground such that the platform may move in an omni-directional manner therealong. The large number of upwardly facing casters on the upper surface of the platform 12 provides a support for articles such that omnidirectional movement may be imparted thereto.

This provision of a large number of casters on both the upper and lower surfaces of the platform 12 results in each caster picking up a relatively small portion of the total load. Therefore, the casters are markedly more responsive to desired movement and changes in direction than previous arrangements.

The manner in which the channels and the caster units are connected together in this embodiment is best shown in FIG. 3. Each channel is secured to the flanges of adjacent channels. For example, the channel designated B in FIG. 3 is connected to the channel designated A by rows of bolts 48 and 50 and to the channel designated C by rows of bolts 52 and 54. It will be noted that rows of bolts 50 and 52 also connect the base plates 32 of a row of caster units 30 to channel B.

In the same manner, channel C is connected to channel B by rows of bolts 56 and 58, with the base plates 32 of the next row of caster units being connected to channel C by rows of bolts 54 and 56.

Referring now to FIGS. 2, 4 and 5, a corner member 60 is mounted adjacent the corners of the platform 12. A restraint unit 62 is mounted on each corner member for retaining loads on the platforms. The restraint units are provided to prevent pallets from sliding from the platform 12 in response to acceleration forces engendered by changes in direction and velocity of the dolly 10.

With particular reference to FIGS. 4 and 5, each restraint unit 62 includes a restraining member 64 pivotally mounted to a corner member 60. The restraining member includes a slot 68 therein, allowing vertical movement of the restraining member along the slot. A pair of stop members, 70 and 72 respectively, are provided to limit the pivotal movement of the restraining member 64 and to fix the latter member in its operative position, shown in solid lines in FIG. 4. To return restraining member 64 to its inactive position, it is first raised along slot 68 and then pivoted clockwise as seen in FIG. 4 until it rests on stop 72 (shown in phantom in FIG. 4).

Referring now to FIGS. 1 and 7–9, a brake assembly 75 for the dolly 10 includes a shaft 78 mounted in platform 12 transversely of the channels 14. As seen in FIG. 7, the shaft is mounted through apertures 80 in the side portions of the downwardly facing channels. A plurality of breaking members 82, each having a ground gripping element 84, are mounted to shaft 78. Shaft 78 is rotatable by a handle 86 that engages shaft 78 through a collar 88 and a pin 90. Pivotal motion of the handle is transmitted to collar 88 by a pin 92 and pivotal motion of the collar is transmitted to shaft 78 by pin 90.

The inactive position of shaft 78 is at an attitude wherein the breaking members 82 extend horizontally. To apply breaking force, the shaft is rotated ninety degrees to engage ground gripping members 84 with the ground. The action of the ground gripping members 84 upon the ground may best be seen in FIG. 7.

Figure 9:
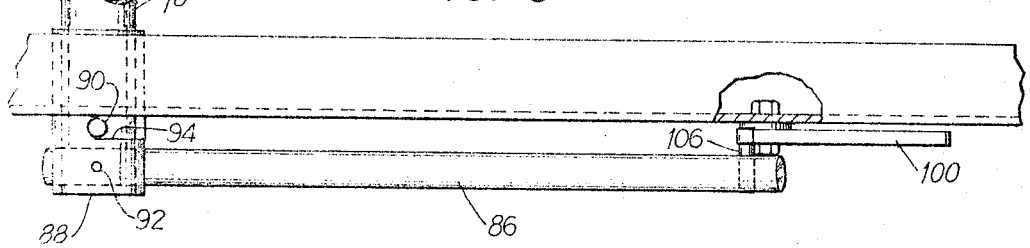
FIG. 9 is a partial plan view of the dolly showing the actuating mechanism for the brake unit.

The ninety degree rotation of shaft 78 to apply the breaking means is effected by approximately a one hundred eighty degree rotation of handle 86 from its inactive position, shown in phantom in FIG. 9, to its breaking position, shown in solid lines in the latter figure.

A slot 94 is provided in collar 88 such that for the initial ninety degrees of rotation of handle 86 clockwise from its inactive position, pin 92 will ride in the slot 94 and not rotate the collar. After the initial ninety degrees of clockwise rotation, the pin will engage the end of slot 94 and rotate the shaft 78 to engage the breaking members 84 with the ground.

A pair of stay members, 98 and 100, are mounted to platform 12 such that they are adjacent handle 86 when the latter is in its inactive and active position respectively. The stay members are spring biased toward shaft 78 by springs 102 and 104 respectively. A pin 106 is mounted adjacent the end of handle 86. Each of the members is operable to engage pin 106 to hold the handle in its position thereat.

The dolly 10 is thus characterized by a low profile for ease of accumulating large size loads thereon and also for providing a capability wherein the addition of the relatively small vertical dimensions of the dolly to the load does not preclude loading the dolly and the load directly into the relatively confined areas of covered trucks and vans.

The provision of a large number of casters on the bottom surface of the dolly permits the dolly to be moved over gaps in surfaces, such as those shown in FIG. 6, wherein the short span between adjacent casters and the light loads assigned to each will preclude unsupported casters from dropping into the gaps to stymie movement of the dolly. This feature becomes of paramount importance when it is desired to move the dolly from a loading dock in a terminal into a truck or railroad car where there are often gaps between the end of the loading dock and the floor of the trucks or railroad car. The prior art dollies are particularly susceptible to being stymied by these gaps due to the spacing between the wheels thereof and the large loads on each wheel.

The corrugated configuration of platform 12 provides a certain degree of flexibility such that the platform may conform to floor curvature and similar variations normally encountered in the intended environment. This assures that a maximum number of casters are in engagement with the ground at all times thereby controlling the load that each caster must support.

Having now fully set forth both structure and operation of preferred embodiments of the concept underlying the present invention, it may be that various other embodiments as well as certain variations and modifications of the embodiments herein shown and described will occur to those skilled in the art upon becoming familiar with said underlying concept. All such embodiments, variations, and modifications as incorporate the spirit of the invention and depend upon its underlying concept are consequently to be considered as within the scope of the claims appended herebelow, unless the claims by their language expressly state otherwise.

What is claimed is:
1. Apparatus for supporting articles, comprising:
   a corrugated platform,
   a plurality of casters mounted to the underside of the upper portions of said corrugated platform for engaging the ground for movement of the platform omnidirectionally therealong, and
   a plurality of casters mounted on the upper surface of the lower portions of the corrugated platform for engaging loads thereon for the omnidirectional movement of the loads thereon.
2. Apparatus according to claim 1, wherein the corrugated platform comprises a plurality of channels mounted together, the sides of the channels diverging away from the bases thereof with the openings of adjacent channels facing in opposite directions.

3. Apparatus according to claim 2, wherein restraint means are mounted on the sides of the corrugated platform for retaining loads thereon.

4. Apparatus according to claim 2, wherein the casters are mounted in rows to the bases of the channels.

5. Apparatus according to claim 1, wherein braking means are mounted on the platform.

6. Apparatus for supporting and transporting articles, comprising:

a platform structure having a plurality of lower mounting surfaces, and a plurality of upper mounting surfaces said lower mounting surfaces being accessible from the upward side of said structure and said upper mounting surfaces being accessible from the lower side of said structure, said upper and lower mounting surfaces being juxtaposed alternatively throughout said structure, a plurality of upwardly directed rolling members mounted to said lower mounting surfaces for supporting loads for movement thereon, and a plurality of downwardly directed rolling members mounted to said upper mounting surfaces for engaging the ground for movement of the structure and load therealong.

7. Apparatus for supporting and transporting articles according to claim 6, wherein:

said upwardly and downwardly directed rolling members are casters such that the apparatus may support loads for omnidirectional movement thereon and move omnidirectionally along the ground.

References Cited

UNITED STATES PATENTS 3,243,062   3/1966   Frassetto _____ 214—84

LEO FRIAGLIA, Primary Examiner

ROBERT R. SONG, Assistant Examiner

U.S. Cl. X.R.

214—84